US008804575B2

(12) United States Patent
Kumar et al.

(10) Patent No.: US 8,804,575 B2
(45) Date of Patent: Aug. 12, 2014

(54) CENTRAL ENTITY TO ADJUST REDUNDANCY AND ERROR CORRECTION ON RTP SESSIONS

(75) Inventors: Rajesh Kumar, Palo Alto, CA (US); Mohamed S. Mostafa, Emeral Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 1266 days.

(21) Appl. No.: 11/300,010

(22) Filed: Dec. 13, 2005

(65) Prior Publication Data

US 2007/0133515 A1    Jun. 14, 2007

(51) Int. Cl.
*H04L 12/16* (2006.01)
*H04L 12/66* (2006.01)
*G06F 15/16* (2006.01)

(52) U.S. Cl.
USPC ........... 370/260; 370/352; 370/353; 370/354; 370/355; 370/356; 709/204; 709/207

(58) Field of Classification Search
USPC .................. 370/352–356, 260; 709/204–207
See application file for complete search history.

(56) References Cited

U.S. PATENT DOCUMENTS

| | | | | |
|---|---|---|---|---|
| 6,157,653 | A * | 12/2000 | Kline et al. | 370/412 |
| 6,298,055 | B1 * | 10/2001 | Wildfeuer | 370/352 |
| 6,823,381 | B1 * | 11/2004 | Harper | 709/224 |
| 7,307,980 | B1 * | 12/2007 | Shah | 370/352 |
| 7,392,311 | B2 * | 6/2008 | Grabarnik et al. | 709/224 |
| 7,627,290 | B2 * | 12/2009 | Wing et al. | 455/67.13 |
| 7,756,106 | B2 * | 7/2010 | Nakao et al. | 370/352 |
| 8,032,808 | B2 * | 10/2011 | Vargo et al. | 714/746 |
| 2001/0021186 | A1 * | 9/2001 | Ono et al. | 370/352 |
| 2002/0059432 | A1 * | 5/2002 | Masuda et al. | 709/227 |
| 2003/0202507 | A1 * | 10/2003 | Nishida et al. | 370/352 |
| 2004/0073690 | A1 * | 4/2004 | Hepworth et al. | 709/230 |
| 2004/0165526 | A1 * | 8/2004 | Yada et al. | 370/228 |
| 2005/0007965 | A1 * | 1/2005 | Hagen et al. | 370/260 |
| 2005/0090228 | A1 * | 4/2005 | Black | 455/405 |
| 2005/0201370 | A1 * | 9/2005 | Poyhonen et al. | 370/389 |
| 2005/0226182 | A1 * | 10/2005 | Itoh | 370/329 |
| 2006/0203976 | A1 * | 9/2006 | Erhart et al. | 379/88.01 |
| 2006/0252376 | A1 * | 11/2006 | Fok et al. | 455/67.13 |
| 2007/0097957 | A1 * | 5/2007 | Cao et al. | 370/352 |

OTHER PUBLICATIONS

Clark et al., "RTCP HR—High Resolution VoIP Metrics Report Blocks", Jun. 2005, Internet Engineering Task Force, pp. 2-26.*

(Continued)

*Primary Examiner* — Luat Phung
*Assistant Examiner* — Kai Chang
(74) *Attorney, Agent, or Firm* — Baker Botts L.L.P.

(57) ABSTRACT

An example embodiment may include an apparatus comprising a message buffer to receive messages from a voice over packet endpoint if impairments in a media stream pass a threshold, and a processor coupled with the message buffer, the processor to determine changes to media characteristics for the voice over packet endpoint in relation to the impairments and to signal the voice over packet endpoints to adjust media characteristics of the media stream in both directions. Another example embodiment may be a method comprising monitoring a voice over packet media stream for impairments, computing Voice over packet quality metrics based on the impairments, sending or receiving the Voice over packet quality metrics to or from a session peer, when a threshold is crossed for the Voice over packet quality metrics, sending an event notification to a central entity, and changing media characteristics of the voice over packet media stream in relation to the impairments as directed by the central entity.

23 Claims, 10 Drawing Sheets

(56) References Cited

OTHER PUBLICATIONS

J. Bolot, S. Fosse-Parisis, D. Towsley; "Adaptive FEC-Based Error Control for Internet Telephony," INFOCOM'99, Eighteenth Annual Joint Conference of the IEEE, 1999—ieeexplore.ieee.org (8 pages).
Friedman, T., R. Caceres, A. Clark, *Request for Comments: 3611 RTP Control Protocol Extended Reports (RTCP XR)*, The Internet society (2003), Nov. 2003, 52 pages.

C. Perkins, I. Kouvelas, O. Hodson, V. Hardman, M. Handley, J.C. Bolot, A. Vega-Garcia, S. Fosse-Parisis, *Request for Comments: 2198 RTP Payload for Redundant Audio Data*, Sep. 1997, 11 pages.
J. Rosenberg, H. Schulzrinne, *Request for Comments: 2733 An RTP Payload Format for Generic Forward Error Correction*, The Internet Society (1999), Dec. 1999, 25 pages.

* cited by examiner

CENTRAL ENTITY TO ADJUST REDUNDANCY AND ERROR CORRECTION ON RTP SESSIONS

BACKGROUND

Conventional telephone conversations take place over a circuit switched network. A circuit-switched network involves a dedicated physical path for a single connection between two end-points for the duration of the connection. In the Public Switched Telephone Network (PSTN), a telephone service provider dedicates a physical path between two endpoints to a called number for the duration of a call.

In contrast to circuit switched networks, packet switched networks can be used to transmit telephone calls without requiring a dedicated connection, which leads to reduced costs. Packet switched networks typically use protocols to divide messages or data into packets. Division into packets allows each packet to be transmitted individually. In most packet switched networks, packets are allowed to follow different routes to a destination. After the packets arrive at the destination, they can be recompiled into the original message. An example packet switched network is the global computing network often referred to as the Internet.

Example packet switched networks may use Transmission Control Protocol/Internet Protocol (TCP/IP), X.25, and Frame Relay protocols. In contrast to circuit switched networks that were conventionally used for real-time communications, packet switching allows for delays in transmission, and provides extra control such as retransmission of data, recognition of duplicate messages, flow control mechanisms, etc. In general, packet switched networks provide a robust system for information transfer. Additionally, packet switched networks provide a low cost solution for information transfer since it does not require dedicated leased paths between endpoints.

Improvements in communications and computing technologies allow conventional real-time applications over a packet switched network. For example, in a voice over Internet Protocol (VoIP) network, audio phone information is converted from analog to digital format and sent through a packet switched network. This allows for delivery of audio information at a much lower monetary cost than through a dedicated PSTN circuit, however it has an associated cost in the quality of the communication.

The fundamental transport mechanism for voice-over-packet telecommunication systems is data packets, which are generated at a transmitter and sent at regular, short intervals to a receiver. A standard voice quality impairment is 'packet loss' in which packets from a transmitter do not arrive as expected at the receiver. Impairments may be any degradation in strength, value, quality, etc., of a media stream.

Packet loss is widely understood to be a primary source of voice quality degradation due to transmission network impairment. Voice-over-packet equipment often uses packet counts for voice quality metrics, such as 'packets received', 'packets lost', 'late packets', 'early packets' etc. Various other means have been employed to measure voice quality in telecommunications networks. For linear systems, objective audio measurements such as frequency response and signal-to-noise ratios are typical. To estimate user experience, subjective test methodologies such as ACR (absolute category ranking) are employed. MOS (mean-opinion-scores) is an example of an ACR test, in which users are presented with audio material and make listening judgments about quality on a five-point scale (1-bad, to 5-excellent).

Conventional Voice-over-packet (VOP) systems may use other quality metric methodologies. MOS tests are non-real-time experiments involving human listeners, and are not run directly on revenue-generating calls, although predictions of MOS scores can be made. The use of non-linear, low-bit-rate audio codecs such as an International Telecommunication Union (ITU) standard G.729 means that some traditional measurements of audio quality such as frequency response are not used since linear methods do not characterize a non-linear system.

Packet redundancy and forward error correction (FEC) can be used to compensate for random and bursty packet loss, but these approaches have limitations in real time applications such as VoIP in a real time transport protocol (RTP) environment. Application of packet redundancy or FEC to all VoIP calls consumes valuable bandwidth, particularly when neither packet redundancy or FEC is required. This may also contribute to congestion and therefore increase loss, jitter, delay, reduce MOS scores, etc., if applied in a distributed manner to sessions (more than a certain number) with impaired media streams. The number of sessions that packet redundancy or FEC may be applied is limited by available bandwidth, which is limited in many scenarios. Low-bit-rate audio codecs (coder/decoders) and digital signal processing (DSP) techniques may also be employed to conserve bandwidth in voice communications, but may degrade the quality of a voice signal.

"Adaptive FEC-Based Error Control for Internet Telephony", by Bolot, Fosse-Parisis and Towsley, 1999, discusses an adaptive spacing of packets to maximize the probability of packet reception and determination of encoding rates to maximize the quality of a transfer subject to a rate constraint.

The Bolot, Fosse-Parisis and Towsley approach aims to optimize a subjective measure as opposed to an objective measure of quality. However this approach does not provide for a centralized, coordinated adaptive assignment of packet redundancy or different levels of FEC to impaired calls. Additionally, this approach does not provide for throttling redundancy or FEC mechanisms once a critical impaired session volume is reached, such as a critical session volume correlating to network congestion. What is needed is a centralized entity to dynamically manage redundancy and error correction in relation to impairments.

SUMMARY

An example embodiment may be a system including a first voice over packet endpoint to send a media stream to a second voice over packet endpoint, the second voice over packet endpoint to monitor the media stream for impairments, and compute quality metrics based on the impairments and to detect when a threshold is crossed for the quality metrics, and a central entity to change media characteristics of the media stream in relation to the impairments in response to a detected threshold crossing of the quality metrics. In some embodiments an endpoint may also compute threshold crossings for quality metrics that are received from a session peer.

Another example embodiment may be a method comprising monitoring a voice over packet media stream for impairments, computing quality metrics based on the impairments, sending the quality metrics to a session peer, when a threshold is crossed for the quality metrics, sending an event notification to a central entity, and changing media characteristics of the voice over packet media stream in relation to the impairments as directed by the central entity.

And yet another example embodiment may include a message buffer to receive messages from a voice over packet endpoint if impairments in a media stream pass a threshold, and a processor coupled with the message buffer, the processor to determine changes in media characteristics for the voice over packet endpoint in relation to the impairments and to signal the voice over packet endpoint to adjust media characteristics of the media stream.

BRIEF DESCRIPTION OF THE DRAWINGS

Embodiments of the invention may be best understood by reading the disclosure with reference to the drawings, wherein.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

An embodiment may provide a central or a distributed feedback system for a Voice over Packet (VOP) media stream that triggers different levels of correction in response to threshold crossings for media impairments. VoIP embodiments are explained throughout this detailed description but embodiments may include VOP media streams generally, or any packet based real time media stream with similar functionality. RTP endpoints are a more general class of endpoints that includes VoIP endpoints, and the two terms are used interchangeably at times in this detailed description.

Some embodiments may use central or distributed call control. Call control may include the control and/or negotiation of redundancy or FEC as correction mechanisms. Additionally, embodiments may jointly control redundancy, FEC, etc. at the same time, but the disjunctive "or" is used for convenience to show it may be either approach while in fact a combined approach is also contemplated, taught and claimed in this disclosure.

Figure 1:
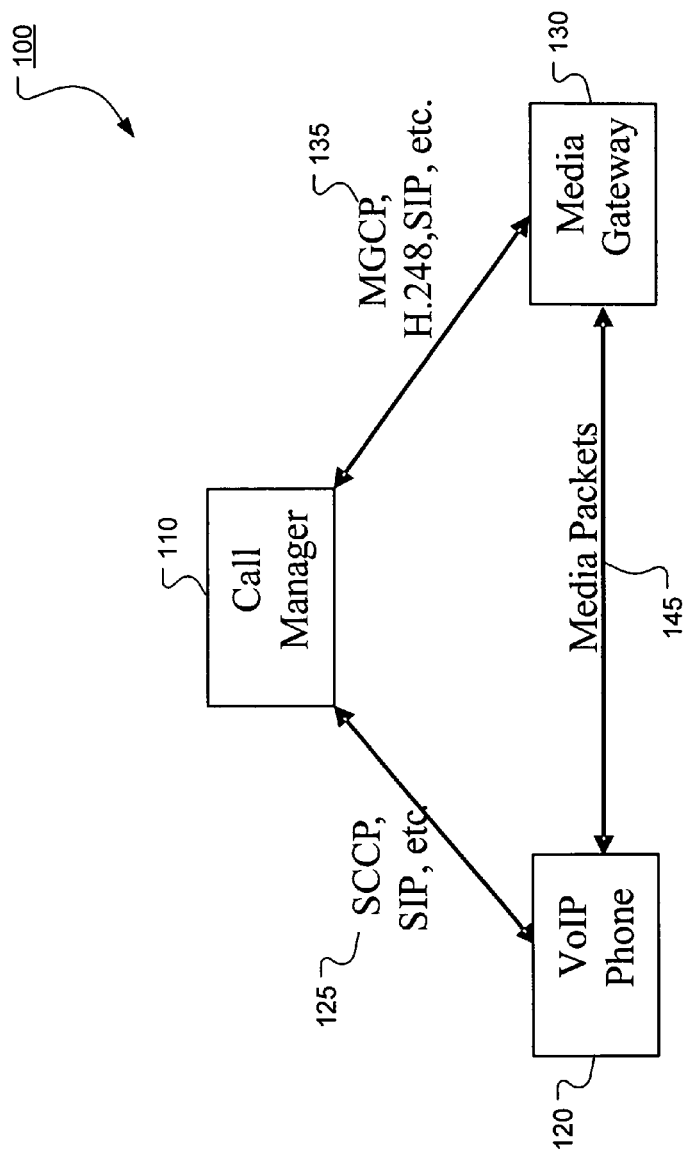
FIG. 1 illustrates an embodiment system that may provide a central entity to adjust redundancy and error correction on an RTP session.

FIG. 1 illustrates an embodiment system 100 that may provide a central entity to adjust redundancy and error correction on an RTP session. In the embodiment shown in FIG. 1, the central entity is a call manager 110. Call manager 110 is in communication with a VoIP phone 120 and a media gateway 130.

In an example embodiment, RTP endpoints may monitor a media stream for impairments such as packet loss and compute quality metrics. Example metrics include MOS-listening quality (MOS-LQ), round-trip packet loss, frame loss, inter-arrival jitter, MOS-conversational quality (MOS-CQ), estimated metrics such as ITU G.107 R-factor, etc. In an embodiment, these metrics may be conveyed to a session peer via the internet engineering task force (IETF) real time control protocol (RTCP, RFC 3550) or IETF real time control protocol with extended reports (RTCP-XR, RFC 3611). An embodiment RTP endpoint may be a VoIP endpoint, which may be any node that originates or terminates a VoIP call. Examples are VoIP phones, VoIP softphones, VoIP media gateways, VoIP media servers, etc. Session peers may be any type of device that is in communication with an RTP endpoint with the media stream.

Referring to the embodiment in FIG. 1, VoIP phone 120 communicates a media stream comprising media packets 145 with media gateway 130. Embodiments are not limited to communicating the media packets 145 as shown in the figure, for example, another example embodiment may have any VoIP phones communicating media packets 145 or media gateways communicating media packets 145. In the embodiment in FIG. 1, VoIP phone 120 communicates with call manager 110 using Skinny Client Control Protocol (SCCP), Session Initiation Protocol (SIP) in RFC 3261, etc. 125, but other signaling protocols may be used. Similarly, the embodiment illustrates the media gateway 130 communicating with the call manager 110 with Media Gateway Control Protocol (MGCP) in RFC 3435, H.248, etc. 135, but other signaling methods may be used.

Referring to the embodiment shown in FIG. 1, system 100 may include a first voice over packet endpoint such as VoIP phone 120 to send a media packets 145 to a second voice over packet endpoint such as media gateway 130, and the second voice over packet endpoint may monitor the media stream for impairments, compute quality metrics based on the impairments and detect when a threshold is crossed for the quality metrics. In some embodiments an endpoint may also compute threshold crossings for quality metrics that are received from a session peer.

System 100 may further include a central entity such as call manager 110 to change media characteristics of the media stream in relation to the impairments in response to a detected threshold crossing of the quality metrics. In some embodiments a central entity may control VoIP endpoints through one of the following protocols: SCCP, MGCP, H.248.1, SIP, etc., as examples. Central coordination and throttling of corrective, consequent actions improves feedback control loop stability.

In some embodiments the central entity, for example call manager 110, can throttle the changes in media characteristics of the media stream, in this example media packets 145, in response to reaching a criticality threshold where media quality would be deteriorated by the media characteristics changes. This criticality threshold may be defined in terms of the number of currently active sessions that have redundancy or FEC associated with them. In this embodiment, one or more thresholds may be set for a quality metric. When a threshold is crossed at any of a group of session peers, an event notification may be sent to a central entity such as a call manager/agent, media performance manager, policy server, etc.

Embodiments may be useful for any similar types of treated calls where error control treatment such as redundancy under IETF RFC 2198 or FEC under IETF RFC 2733 are applied. Additionally, it should be taken into consideration in some embodiments that there is no guarantee that RFC 2198 or RFC 2733 will be used since one or both endpoints can reject a request by the central call control entity or a media performance manager to use RFC 2198 or RFC 2733. Such rejections are usually based on the unavailability of resources.

Some embodiments may use a distributed call control with no central call control entity and call control is distributed in endpoints. An example signaling protocol used in these embodiments is SIP. In a distributed call control embodiment, SIP may also be used between an endpoint and a media performance server.

On receiving a threshold crossing notification for a given metric, the centralized entity can change characteristics of the media stream to include or augment redundancy or different levels of FEC to match the nature and degree of impairment. The centralized entity can signal these changes to the VoIP endpoint via signaling protocols such as by MGCP, H.248.1, SCCP or SIP etc. The present embodiment uses either redundancy or FEC, but embodiments are not so limited, and may use a central entity to adjust any media characteristics in response to impairments and provide a more robust media stream.

In one embodiment, a central entity may determine changes in media characteristics, and also the bandwidth impact of these changes. In this embodiment, a central entity may be pre-configured with a criticality threshold, for example in terms of the number of sessions beyond which the use or increase of redundancy or FEC will cause congestion and actually deteriorate media quality. When this criticality threshold is reached, the embodiment can stop modifying the media characteristics in response to impairments.

In some embodiments, a centralized control entity or the media performance manager may tailor the level of redundancy or FEC to correspond to which metric experienced a threshold crossing. For example, some metrics may warrant more error control. Additionally, the present embodiments may tailor the level of redundancy or FEC to the severity of the threshold crossing. These embodiments are particularly suitable with multiple thresholds, for example below a first threshold a condition may be deemed critical while below a second threshold it may be deemed severe but not critical.

In some embodiments, the media characteristics may include at least one of redundancy under RFC 2198 or FEC under RFC 2733. In another embodiment, the call manager 110 may compute the bandwidth impacts of changes in media characteristics and determine whether additional bandwidth is available in the network. It may perform this computation in lieu of or in addition to comparing the number of active sessions with redundancy or FEC and comparing the result to a criticality threshold.

Example VoIP quality metrics for these embodiments include MOS-listening quality (MOS-LQ) and G.107 R-factor metrics. In some embodiments the VoIP phone 120 and the media gateway 130 may communicate the VoIP quality metrics with each other with Real-time Control Protocol Extended Reports (RTCP-XR). In some embodiments the VoIP quality metrics may be objective metrics such as concealed seconds or severely concealed seconds.

In some embodiments, the VoIP phone 120 and the media gateway 130 may communicate and can notify a central entity 110 of a VoIP quality metric threshold crossing with SCCP, MGCP, SIP or H.248, as examples.

Figure 2:
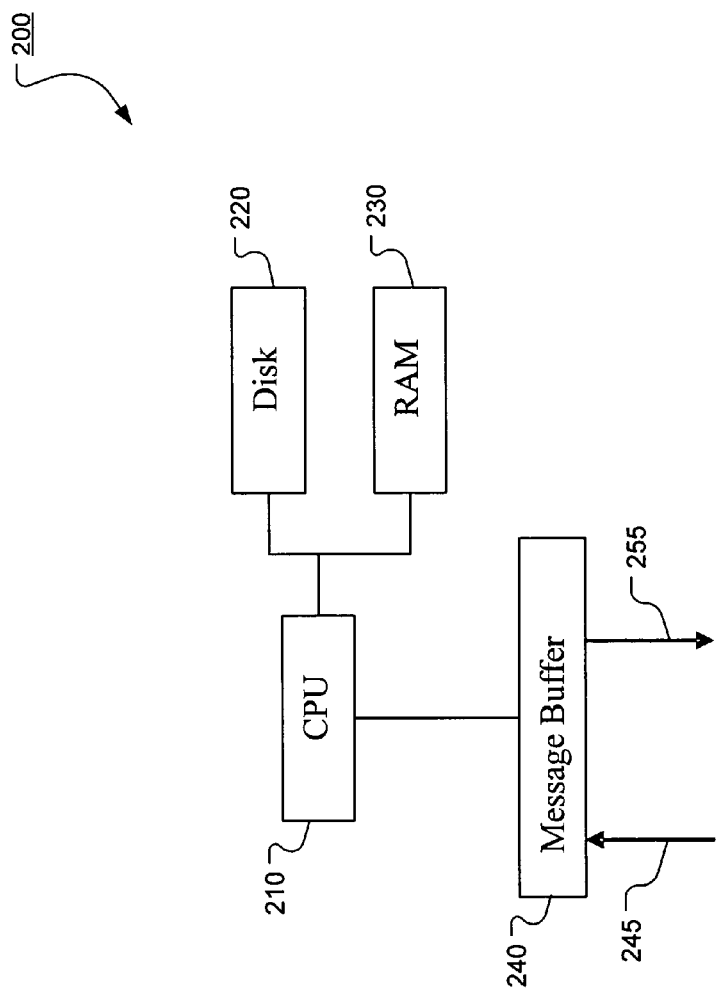
FIG. 2 illustrates an embodiment central entity that may adjust redundancy and error correction on an RTP session.

FIG. 2 illustrates an embodiment central entity 200 to adjust redundancy and error correction on an RTP session. In one embodiment, the central entity 200 may be a central call control entity such as a call manager. In another example embodiment, the central entity 200 may be a media performance manager. Referring to FIG. 2, the central entity 200 in the present embodiment includes a central processing unit (CPU) 210 coupled with memory such as disk 220 and RAM 230. CPU 210 is further coupled with a message buffer 240. In a Central Call Control Entity embodiment, message buffer 240 may receive MGCP, SCCP, H.248.1 or SIP signaling messages as shown at 245, from a VoIP endpoint 120 or 135, and may also send similar signaling messages to VoIP endpoints 120 or 135 as shown at 255.

In an embodiment central entity 200, a message buffer 240 may receive messages from a voice over packet endpoint 120 if impairments in a media stream pass a threshold, and a processor coupled with the message buffer 240, such as CPU 210, may signal the voice over packet endpoint 120 to adjust media characteristics in relation to the impairments. In an embodiment, the CPU 210 can throttle the changes in media characteristics in response to reaching a criticality threshold where media quality would be deteriorated by the media characteristics changes.

Central entity 200 may have similarities to the embodiment system 100 in FIG. 1. For example, the media characteristics may include at least one of redundancy under RFC 2198 or FEC under RFC 2733. In some embodiments CPU 210 can compute the bandwidth impacts of media characteristics changes. Example VoIP quality metrics for these embodiments include MOS-LQ and G.107 R-factor metrics. In some embodiments the VoIP quality metrics may be objective metrics such as concealed seconds or severely concealed seconds.

In another example embodiment, the central entity 200 may be a media performance manager. In this embodiment, messages may be received from an endpoint and sent to an endpoint from the message buffer 240 in similar fashion to the central call control entity above. In one example, the media performance manager may receive SIP PUBLISH messages for threshold reports, may receive SIP SUBSCRIBE messages for a subnet-wide media error control state, and may send SIP NOTIFY messages to an endpoint for error control.

Figure 3:
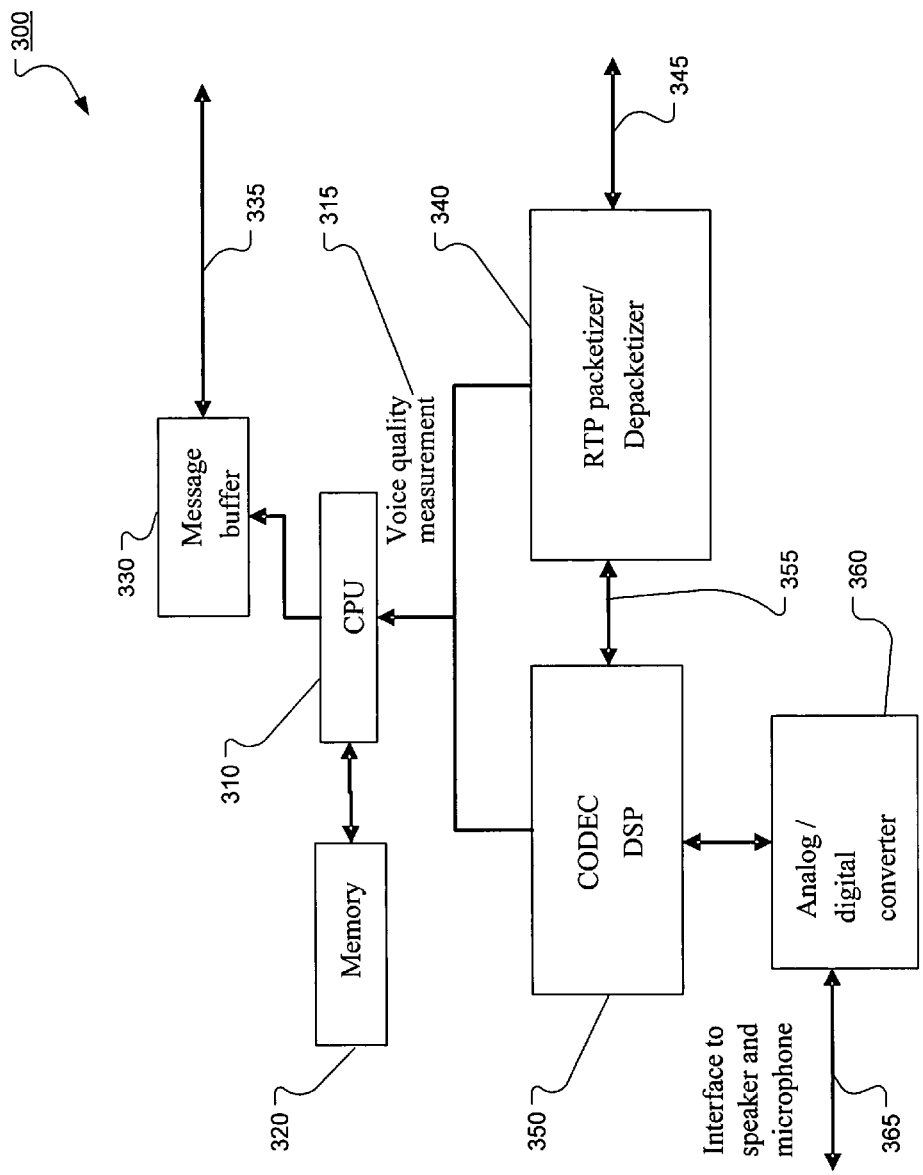
FIG. 3 is a block diagram illustrating an embodiment VoIP telephone

FIG. 3 is a block diagram illustrating an embodiment VoIP end terminal 300. An example VoIP end terminal is a VoIP phone, a softphone, etc. In some embodiments, VoIP end terminal 300 may comprise a CPU 310 coupled with a message buffer 330. The message buffer 330 may send or receive signaling messages 335, for example from a media performance manager. According to the present embodiment, CPU 310 is also coupled with a memory 320. Referring to FIG. 3, VoIP end terminal 300 may include a coder/decoder (CODEC) digital signal processor (DSP) 350 coupled with the CPU 310 as well as a RTP packetizer/depacketizer 340 coupled with CPU 310. Example RTP packetizer/depacketizers 340 may be embodied in a DSP, a network processor, etc. In the present embodiment, the CODEC DSP 350 and the RTP packetizer/depacketizer 340 may be coupled by link 355. The present embodiment illustrates dedicated DSPs, but other example embodiments may be network processors, software processors, etc. in lieu of DSPs.

In the embodiment illustrated in FIG. 3, CODEC DSP 350 is also coupled with a digital/analog and analog/digital converter 360 that may interface to a speaker and microphone 365. RTP packetizer/depacketizer 340 interfaces to an IP network at 345.

In the present embodiment, VoIP end terminal 300 may monitor a voice over packet media stream 145 for impairments, compute VoIP quality metrics based on the impairments, send the VoIP quality metrics to a session peer, and when a threshold is crossed for the VoIP quality metrics send an event notification to a central entity 200. In some embodiments an endpoint may also compute threshold crossings for VoIP quality metrics that are received from a session peer. For example, VoIP quality metrics, or any voice quality measurements 315 may be sent to CPU 310, and when a threshold is crossed, VoIP end terminal 300 may notify a central entity 200. VoIP end terminal 300 may be used in system 100 or otherwise as directed in this disclosure.

Figure 4:
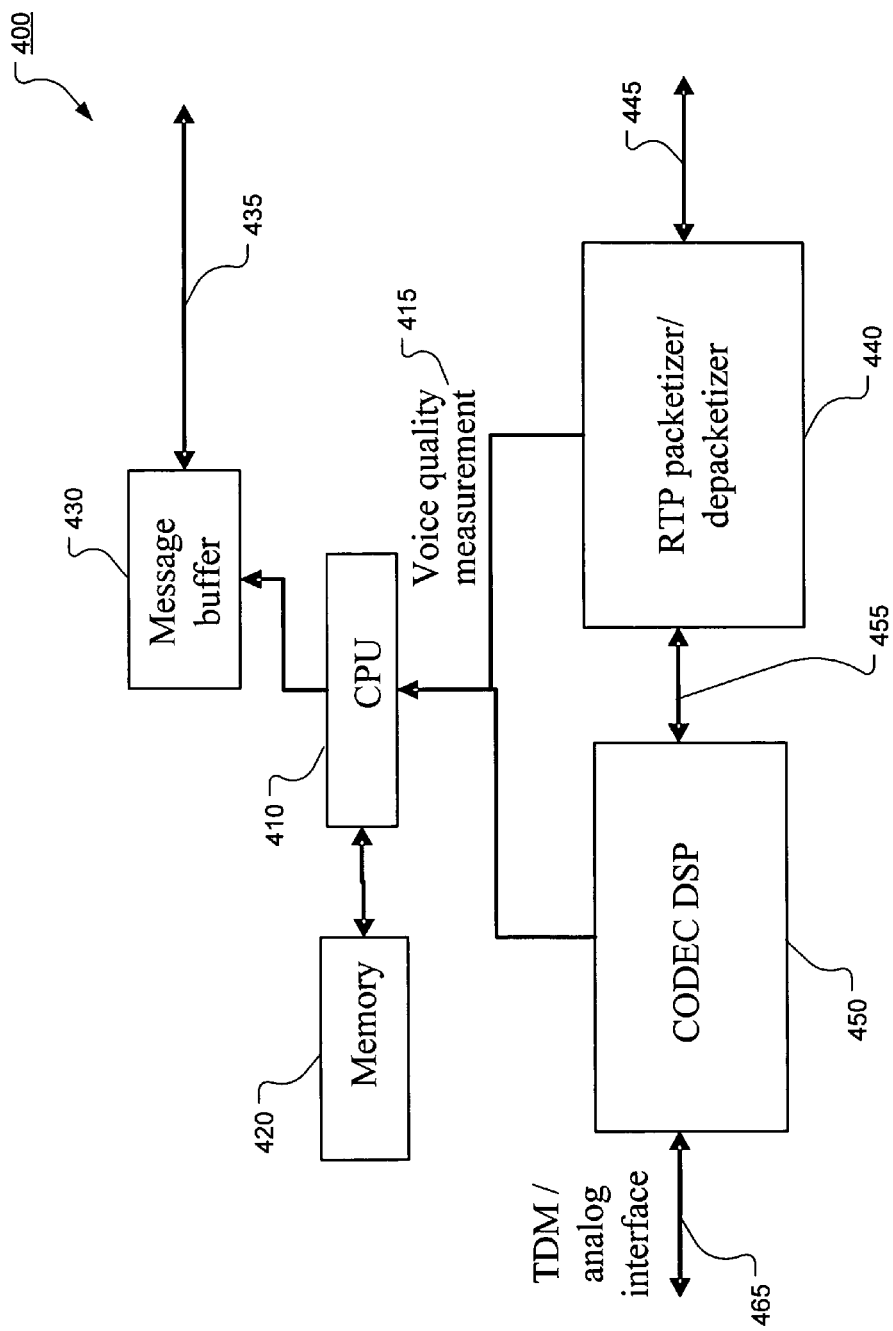
FIG. 4 is a block diagram illustrating an embodiment VoIP media gateway.

FIG. 4 is a block diagram illustrating an embodiment VoIP media gateway 400. In some embodiments, VoIP media gateway 400 may comprise a CPU 410 coupled with a message buffer 430. The message buffer 430 may send or receive signaling messages 435, for example from a media performance manager. According to the present embodiment, CPU 410 is also coupled with a memory 420. Referring to FIG. 4, VoIP media gateway 400 may include a CODEC DSP 450 coupled with the CPU 410 as well as a RTP packetizer/depacketizer 440 coupled with CPU 410. In the present embodiment, the CODEC DSP 450 and the RTP packetizer/depacketizer 440 may be coupled by link 455. The present embodiment illustrates dedicated DSPs, but embodiments need not be so limited.

In the embodiment illustrated in FIG. 4, CODEC DSP 450 is also coupled with a TDM/analog interface 465 and RTP packetizer/depacketizer 440 interfaces to an IP network at 445.

In the present embodiment, VoIP media gateway 400 may have some similar functionality to VoIP end terminal 300. For example VoIP media gateway 400 may monitor a voice over packet media stream 145 for impairments, compute VoIP quality metrics based on the impairments, send the VoIP quality metrics to a session peer, and when a threshold is crossed for the VoIP quality metrics send an event notification to a central entity 200. In some embodiments an endpoint may also compute threshold crossings for quality metrics that are received from a session peer. In similar fashion to VoIP end terminal 300 above, VoIP quality metrics, or any quality measurements 415 may be sent to CPU 410, and when a threshold is crossed, VoIP media gateway 400 may notify a central entity 200. VoIP media gateway 400 may be used in system 100 or otherwise as directed in this disclosure.

Figure 5:
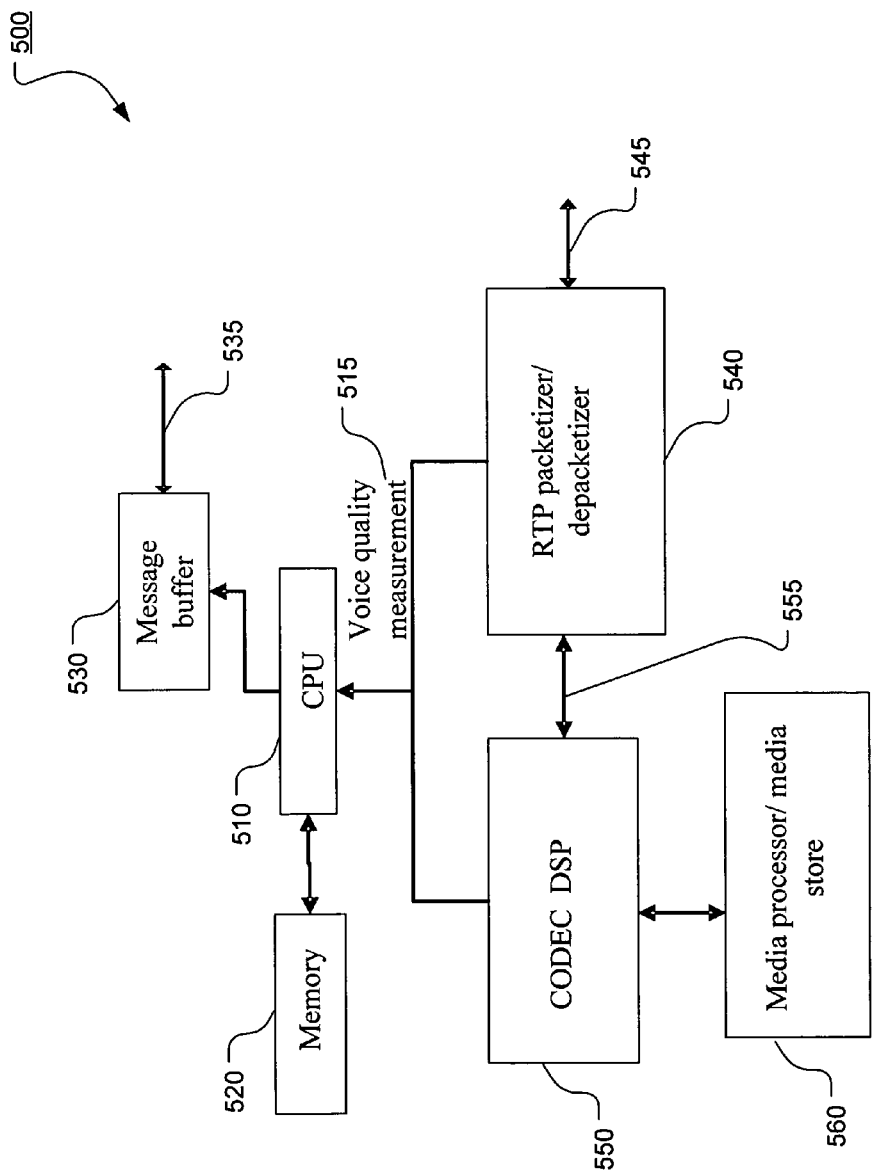
FIG. 5 is a block diagram illustrating an embodiment media server.

FIG. 5 is a block diagram illustrating an embodiment media server 500. In some embodiments, media server 500 may comprise a CPU 510 coupled with a message buffer 530. The message buffer 530 may send or receive signaling messages 535. In the present embodiment, CPU 510 is coupled with a memory 520.

Referring to FIG. 5, media server 500 may include a CODEC DSP 550 coupled with the CPU 510 as well as a RTP packetizer/depacketizer 540 coupled with CPU 510. In the present embodiment, the CODEC DSP 550 and the RTP packetizer/depacketizer 540 may be coupled by link 555. The present embodiment illustrates dedicated DSPs, but embodiments need not be so limited.

In the embodiment illustrated in FIG. 5, CODEC DSP 550 is also coupled with a media processor or media store 560 and RTP packetizer/depacketizer 540 interfaces to an IP network at 545. Media server 500 may also be used in system 100 or otherwise as directed in this disclosure.

Figure 6:
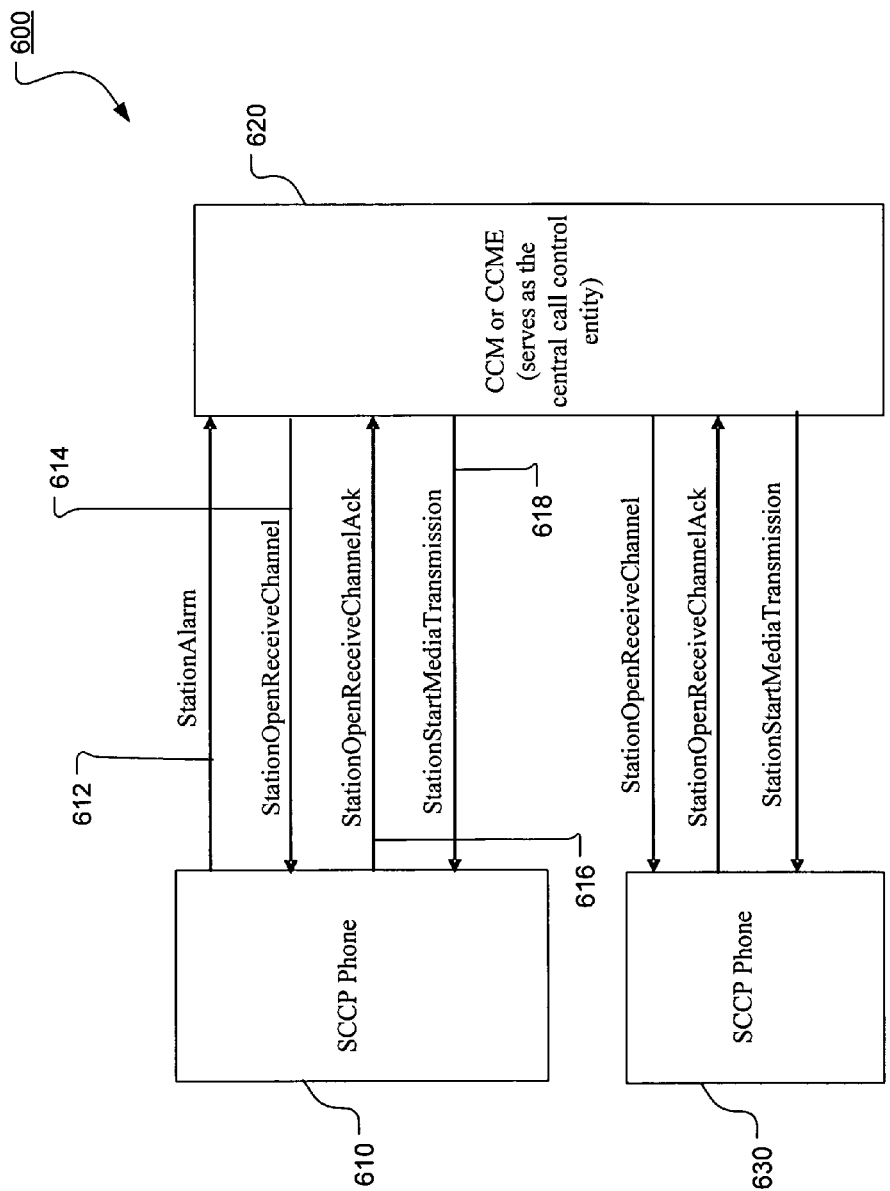
FIG. 6 illustrates an embodiment signaling exchange for Skinny Client Control Protocol (SCCP) messages.

FIG. 6 illustrates an embodiment signaling exchange 600 for Skinny Client Control Protocol (SCCP) messages including an SCCP phone 610 and a call manager (CCM)/call manager express (CCME) 620. According to this embodiment, the SCCP phone 610 and a CCM or CCME 620 may exchange SCCP messages to change characteristics of a media stream, for example by using RFC 2198 redundancy and/or RFC 2733 FEC.

In an embodiment, the SCCP phone 610 is programmed to send a StationAlarm message 612 to the CCM/CCME 620 when certain thresholds are crossed. In the present embodiment, the StationAlarm message 612 may contain an alarm severity field and a string characters to identify the metric that crossed the permissible threshold and whether the metric was local or remote. Currently, SCCP messaging could utilize a string of up to 80 characters to identify the metric that cross the permissible threshold and whether the metric was local or remote, but embodiments need not be so limited, feasibly, longer strings of characters could be used in some embodiments.

According to one embodiment, the CCM or CCME 620 may respond by querying the SCCP phone 610 to apply redundancy, for example according to RFC 2198, and/or FEC, for example according to RFC 2733, if the number of treated calls for a subnet has not exceeded a threshold number of calls that the subnet can handle.

The CCM or CCME 620 may use a StationOpenReceiveChannel message 614 and a StationStartMediaTransmission message 618 to instruct the SCCP phone 610 to apply redundancy and/or FEC. In this embodiment, the StationOpenReceiveChannel message 614 conditions the received media stream, while the StationStartMediaTransmission message 618 conditions the transmitted media stream.

The StationOpenReceiveChannel message 614 may include, among other fields, a media payload type. Appropriate payload types for the support of RFC 2198 redundancy and RFC 2733 forward error correction may be included in the StationOpenReceiveChannel message 614.

The StationStartMediaTransmission message 618 may include, among other fields, a remote RTP address and port number, and a media payload type. Similar to the StationOpenReceiveChannel message 614, appropriate payload types for the support of RFC 2198 redundancy and RFC 2733 forward error correction may be included in the StationStartMediaTransmission message 618.

The CCM/CCME conditions the remote end point 630 in a similar manner. If the remote endpoint 630 is homed on a different call control entity, then the CCM/CCME signals the other call control entity to condition the remote endpoint 630 to change characteristics of a media stream, for example by using RFC 2198 redundancy and/or RFC 2733 FEC.

Figure 7:
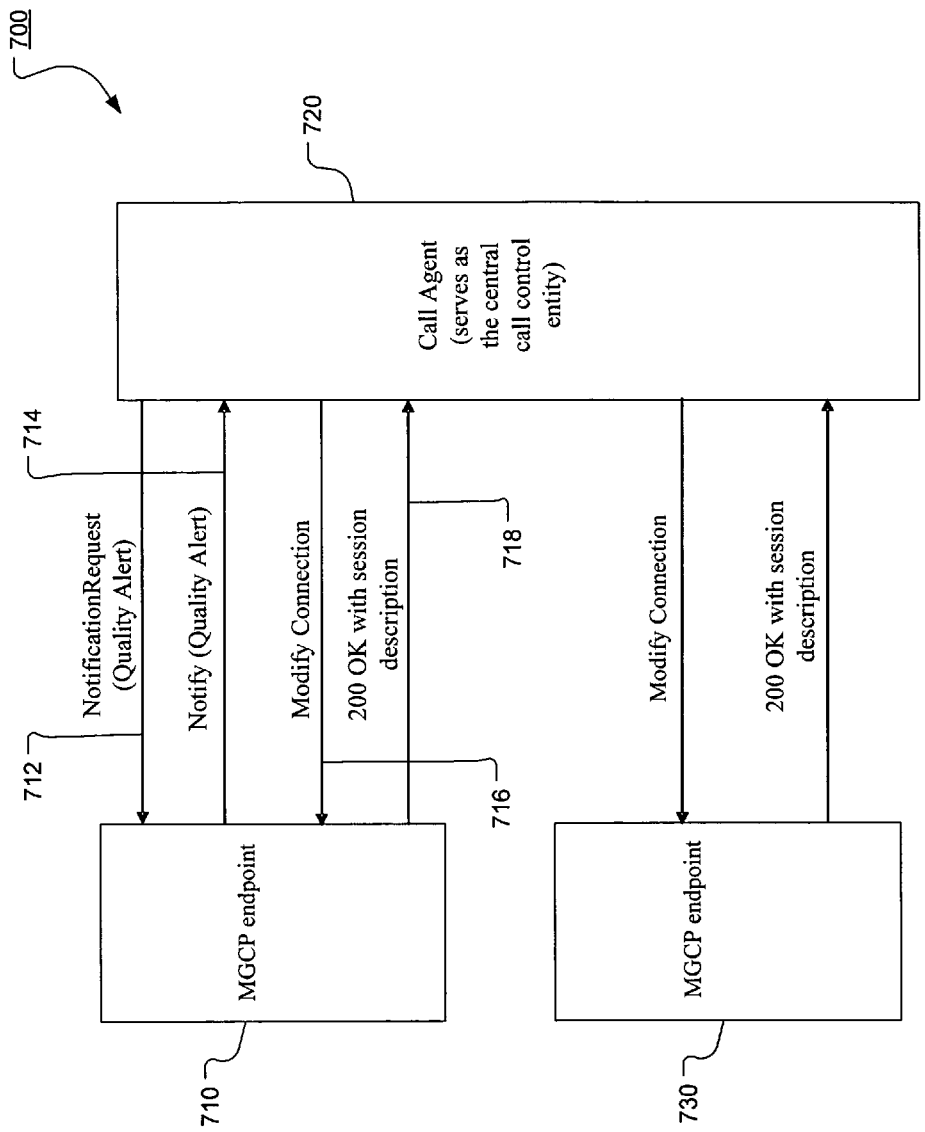
FIG. 7 illustrates an embodiment signaling exchange for Media Gateway Control Protocol (MGCP) messages.

FIG. 7 illustrates an embodiment signaling exchange 700 for Media Gateway Control Protocol (MGCP) messages including an MGCP endpoint 710 and a call agent 720. In accordance with an embodiment the call agent 720 may serve as a central call control entity in similar fashion to embodiments described above. According to this embodiment, the MGCP endpoint 710 and call agent 720 may exchange messages to change characteristics of a media stream, for example by using RFC 2198 redundancy and/or RFC 2733 FEC.

In an embodiment, a quality alert event may be used to notify the call agent 720. A quality alert may be used to designate when the packet loss rate or the combination of delay and jitter exceed a quality threshold in accordance with an RTP package in RFC 3660. Furthermore, quality thresholds for delay, jitter and packet loss rate may be provisioned values.

The call agent 720 may request the MGCP endpoint 710 to notify it of a threshold crossing event via the Quality Alert event. An embodiment may use a NotificationRequest message in accordance with RFC 3435 for this purpose, but embodiments need not be so limited. In the present embodiment, when a threshold crossing occurs, an MGCP endpoint 710 may send a notify message 714, according to RFC 3435, with a quality alert event embedded in it.

Referring to FIG. 7, the call agent 720 may respond to a notify message 714 by sending a ModifyConnection command 716, according to RFC 3435, if the number of treated calls for a subnet has not exceeded a threshold number of calls that the subnet can handle. A ModifyConnection command 716 may include parameters indicating the use of RFC 2198 redundancy and/or RFC 2733 FEC, among other parameters.

According to the present embodiment, a '200 OK' message 718 may be sent from the MGCP endpoint 710 as a positive acknowledgement of the ModifyConnection command 716. In some embodiments, the ModifyConnection command 716 may be accompanied by a session description which includes a description of the media stream. For example, the media stream description may include the use of RFC 2198 redundancy and/or RFC 2733 FEC.

In an embodiment, the call agent 720 may condition a remote end point 730 in a similar manner. Furthermore, if the remote endpoint 730 is homed on a different call agent, then call agent 720 may signal the other call agent to condition the remote endpoint 730. In this embodiment, call agent 720 sends the endpoint's session description to the other call agent. In a similar manner to embodiments already described, an example session description may indicates the use of RFC 2198 redundancy and/or RFC 2733 FEC.

Figure 8:
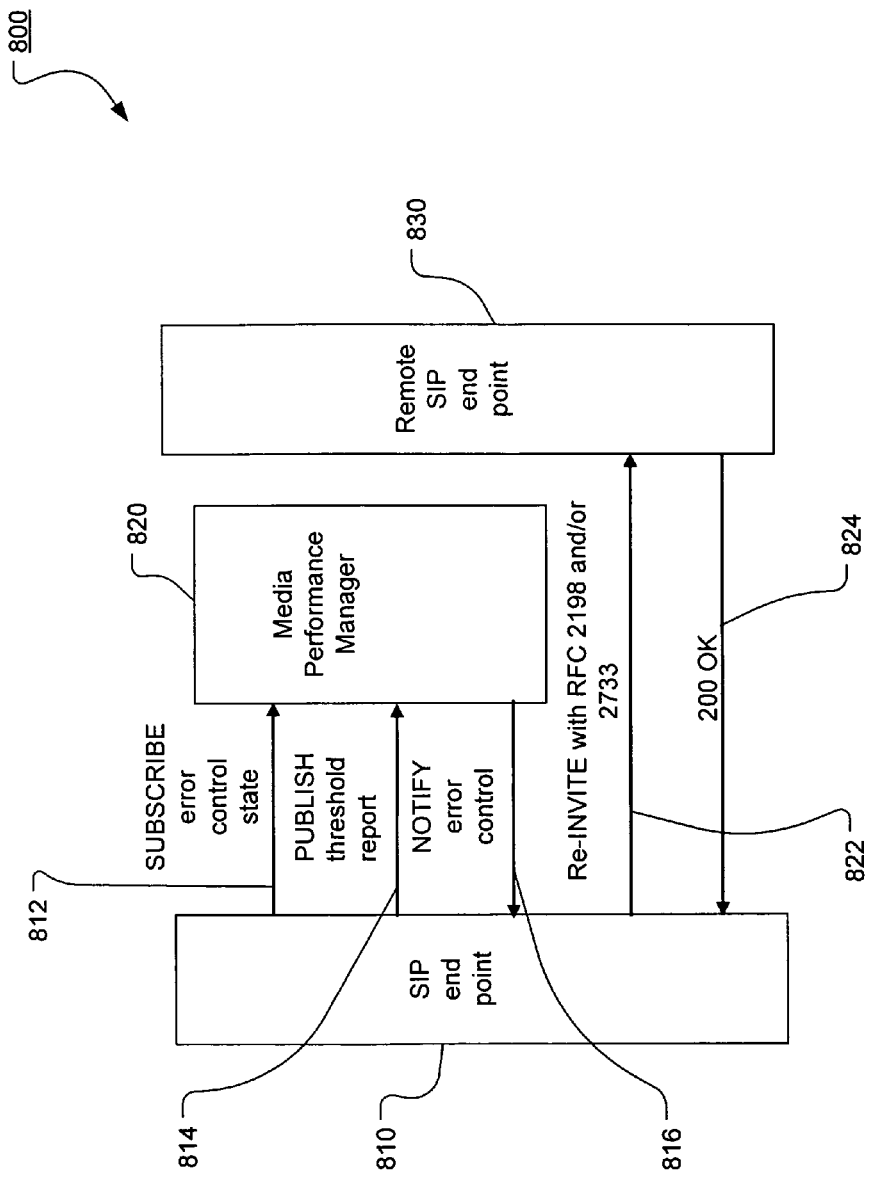
FIG. 8 illustrates an embodiment system with an SIP endpoint, a Media Performance Manager and a remote SIP endpoint.

FIG. 8 illustrates an embodiment 800 including a distributed call control entity with an SIP endpoint 810, a Media Performance Manager 820 and a remote SIP endpoint 830. In system 800, an SIP endpoint 810 and media performance manager 820 may exchange messages to change characteristics of a media stream, for example to change characteristics of a media stream by using RFC 2198 redundancy and/or RFC 2733 FEC.

To illustrate, SIP endpoint 810 may send reports on threshold crossings, for example threshold reports, to a logical entity such as a media performance manager 820. Media performance manager 820 may be responsible for collecting performance reports from endpoints, and managing the media characteristics to compensate for performance impairments. The media performance manager 820 may manage the application of redundancy or FEC for all VoIP sessions internal to a fairly large enterprise or service provider network.

In some embodiments, media performance manager 820 can have oversight of a section of a distributed SIP network, for example a service provider network on an enterprise network. Media performance manager 820 may then be provisioned with a number of treated calls which can be supported by a subnet under its control. However, beyond this threshold, redundancy/FEC treatment should not be applied since it may cause congestion and increase impairments.

Some embodiments may subscribe to and receive notifications for a resource state, for example a subnet-wide error control state, in accordance with RFC 3265. Additionally, reports may be published with SIP in accordance with RFC 3903, Session Initiation Protocol (SIP) Extension for Event State Publication. The content of these published reports is governed by SIP Service Quality Reporting Event, the draft standard for the SIPPING Working Group and a working document of the IETF, dated Oct. 14, 2005.

For example, an SIP endpoint 810 may subscribe to a subnet-wide error control state maintained by media performance manager 820 as shown with SUBSCRIBE message 812 in accordance with RFC 3265. In response to a PUBLISH message 814 (RFC 3903) containing a threshold report by the SIP endpoint 810, the media performance manager 820 can send an NOTIFY message 816 to the SIP endpoint 810 instructing it to apply error control treatment if the overall number of treated calls has not exceeded a provisionable threshold. If the overall number of treated calls has exceeded this threshold, then it may withhold this NOTIFY message 816 in accordance with RFC 3265. On receipt of NOTIFY message 816, the SIP endpoint 810 may send a re-INVITE message 822 to the remote SIP endpoint 830 requesting this media treatment to which the remote SIP endpoint 830 may respond with a 200 OK message 824.

In some embodiments, a threshold report may include: (1) a metric for which a threshold crossing occurred and the severity of the event; (2) a 'direction' of the metric, that is, whether it was locally computed or computed by the remote endpoint. Locally computed metrics refer to the direction from the remote endpoint to this endpoint. Remotely computed metrics refer to the direction from this endpoint to the remote endpoint; and (3) a configurable snapshot of other metrics at the time of the threshold crossing may optionally be included with the threshold report. A configurable snapshot of other metrics may be useful, for example, when a MOS degrades below a threshold it would be possible to determine packet loss and inter-arrival jitter levels.

In distinction with centralized call control, where embodiments are most suitable to enterprise VoIP networks where a cluster of call control entities has purview of the entire enterprise VoIP network, a distributed call control embodiment with a centralized media performance server may be applied to larger-scale enterprise networks and service provider networks.

Figure 9:
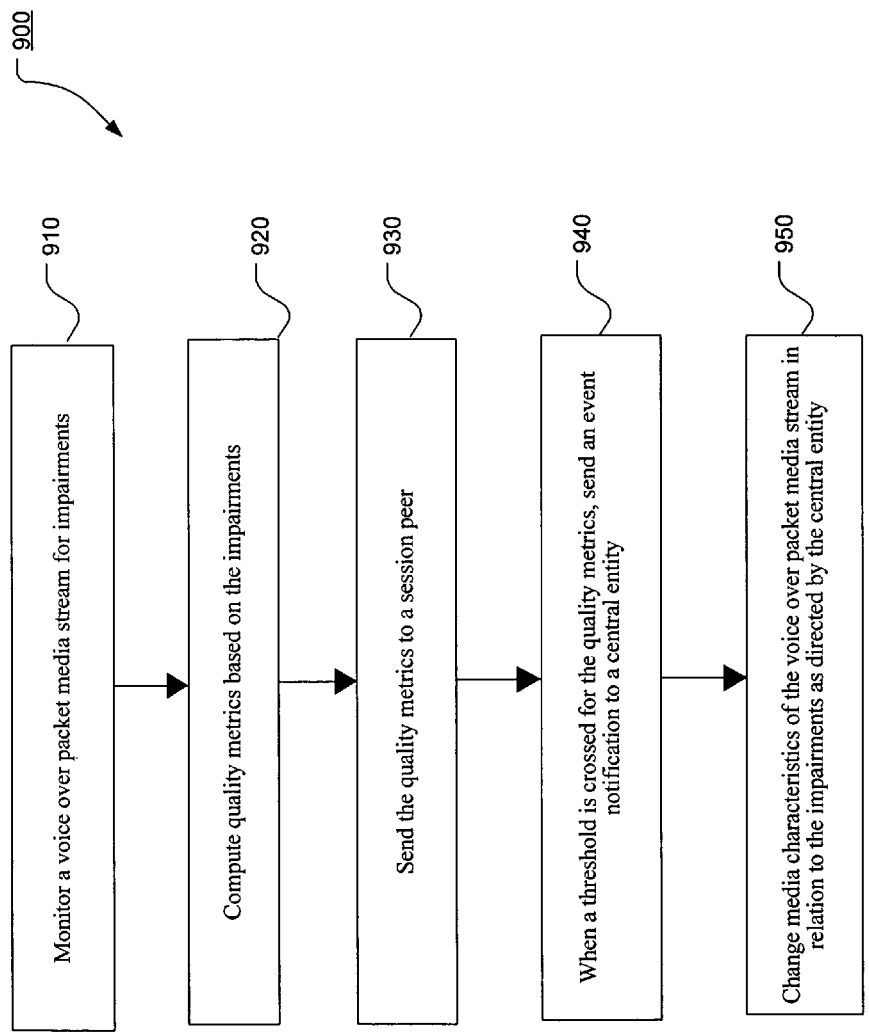
FIG. 9 illustrates an embodiment method for a central entity to adjust redundancy and error correction on an RTP session.

FIG. 9 illustrates an embodiment method 900 to adjust redundancy and error correction on an RTP session. The method may comprise monitoring a voice over packet media stream for impairments as shown in block 910, in block 920 the method may compute quality metrics based on the impairments, send the quality metrics to a session peer as shown in block 930, and as illustrated in block 940, when a threshold is crossed for the quality metrics, method 900 may send an event notification to a central entity and the central entity may notify VoIP endpoints to change media characteristics of the voice over packet media stream in relation to the impairments, as illustrated in block 950. In an embodiment the quality metrics are VoIP quality metrics. In some embodiments an endpoint may also compute threshold crossings for quality metrics that are received from a session peer.

Some embodiments may further comprise throttling the changes in media characteristics in response to reaching a criticality threshold where media quality would be deteriorated by the media characteristics changes. In some embodiments, the media characteristics may include at least one of forward error correction and redundancy.

Some embodiments may be a machine readable medium comprising instructions that when loaded on the machine cause the machine to perform an embodiment method as illustrated with reference to FIG. 9.

Method 900 may further comprise determining the media characteristics changes and the bandwidth impacts of these changes. In similar fashion to the apparatus and system embodiments above, the VoIP quality metrics may be at least one of MOS-LQ, packet loss, frame loss, objective metrics, inter-arrival jitter, MOS-CQ, ITU G.107 R-factor, etc. and may be communicated to a session peer with Real-time Control Protocol Extended Reports (RTCP-XR).

In yet another embodiment method, the event notification may be sent to a central entity with Skinny Client Control Protocol, Media Gateway Control Protocol, Session Initiation Protocol or H.248. In some embodiment methods, the VoIP quality metrics may be concealed seconds objective metrics as disclosed below in FIG. 10.

Figure 10:
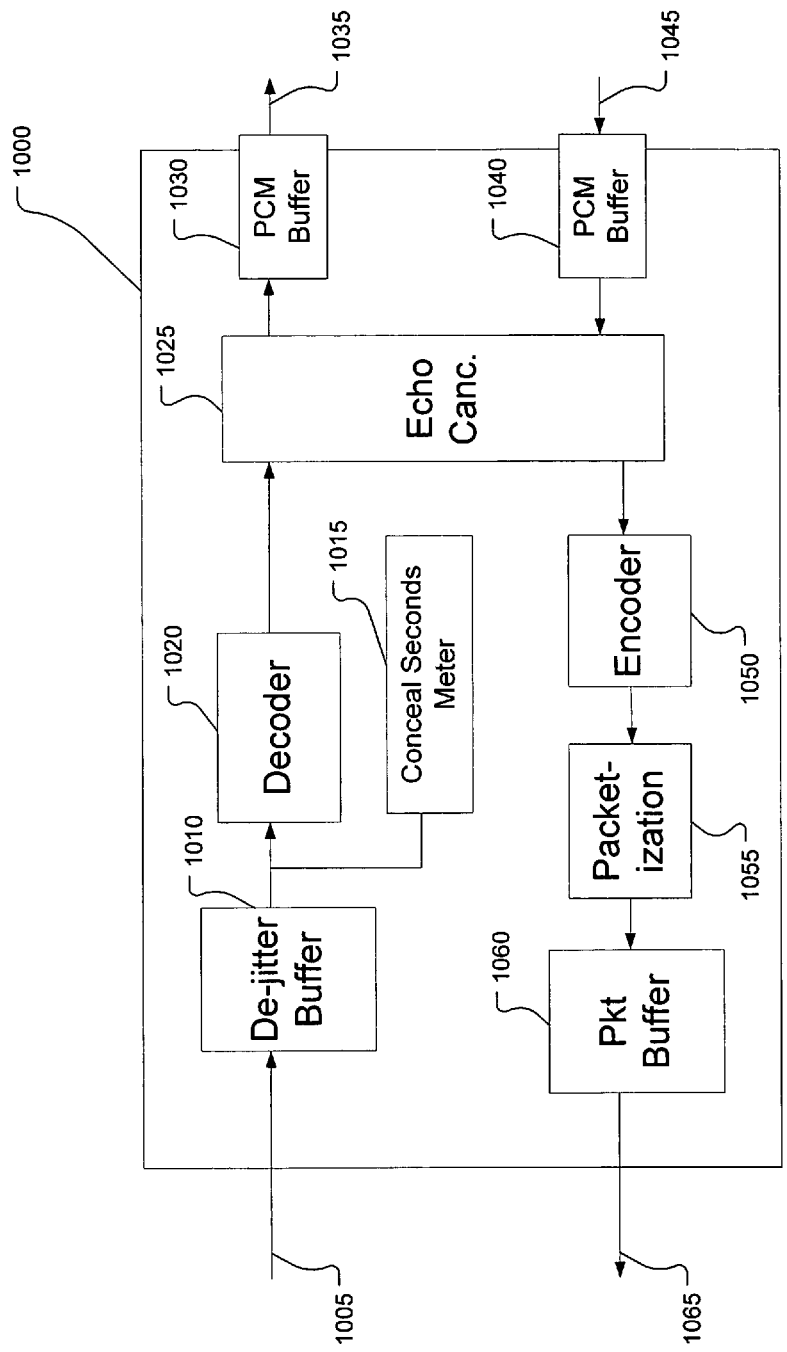
FIG. 10 illustrates an embodiment endpoint that uses an objective measure to determine quality of VoIP data.

FIG. 10 illustrates an embodiment endpoint 1000 that uses an objective metric to determine quality of VoIP data. Object metrics may use a frame loss concealment method as an objective measure of media impairment. Example audio concealment mechanisms used in voice over packet systems include silence, comfort noise, simple last-frame-replay, and sophisticated interpolation methods such as ITU standard G.711 appendix 1 Packet Loss Concealment.

As an example, a concealment vector (CV) comprising a stream of information may be generated by observing a voice over packet endpoint. A CV may be used to derive concealed seconds (CS) counts to use concealment information as an objective measure of media impairment. For example, a "1" may be written to a CV every time decoder creates a concealment frame of audio, while each non-concealed or normally decoded output frame causes a "0" to be written to the concealment vector. This is an example method to generate a CV. Therefore, a concealed seconds meter may process CVs and determine different levels of impairment based upon the concealment events recorded in a CV.

Referring to FIG. 10, endpoint 1000 may include an input 1005 to receive packetized audio information, such as VoIP, and provide it to dejitter buffer 1010. Dejitter buffer 1010 may then provide a synchronous stream of coded frames of audio information that is the payload from the packetized audio information, to decoder 1020. Therefore, a concealed seconds meter 1015 may be coupled to the node between dejitter buffer 1010 and decoder 1020, and it may observe and processes CVs to determinate different levels of impairment based upon the concealment events recorded in the CVs. Endpoint 1000 illustrates an example objective metric that may be used as a quality metric in the above embodiments, but other objective metrics may be used to adaptively and centrally correct for errors in a RTP media stream.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method comprising:
monitoring a voice over packet media stream sent from a first voice over packet endpoint to a second voice over packet endpoint for impairments at the second voice over packet endpoint, the voice over packet media stream sent from the first voice over packet endpoint to the second voice over packet endpoint without passing through a central entity;
computing voice over packet quality metrics based on the impairments at the second voice over packet endpoint;
sending the voice over packet quality metrics from the second voice over packet endpoint to a session peer;
when a threshold is crossed for the voice over packet quality metrics, sending an event notification to the central entity;
preliminarily altering one of packet redundancy levels or forward error correction settings for the voice over packet media stream based on the event notification at the central entity; and
changing, from the central entity in response to the central entity receiving the event notification, media characteristics of the voice over packet media stream in relation to the impairments by signaling at least one of the first or second voice over packet endpoints from the central entity.

2. The method of claim 1 further comprising throttling the changes in media characteristics in response to reaching a criticality threshold where media quality would be deteriorated by the media characteristics changes.

3. The method of claim 1 wherein the media characteristics include at least one of forward error correction and redundancy.

4. The method of claim 1 further comprising determining the media characteristics changes and bandwidth impacts of these changes.

5. The method of claim 1 wherein the voice over packet quality metrics are at least one of MOS-LQ, packet loss, frame loss, objective metrics, inter-arrival jitter, MOS-CQ and ITU G.107 R-factor.

6. The method of claim 1 wherein the voice over packet quality metrics are sent to a session peer with Real-time Control Protocol Extended Reports (RTCP-XR).

7. The method of claim 1 wherein the event notification is sent to a central entity with Skinny Client Control Protocol, Media Gateway Control Protocol, Session Initiation Protocol or H.248.

8. The method of claim 1 wherein the voice over packet quality metrics are concealed seconds and severely concealed seconds objective metrics.

9. An apparatus comprising:
a message buffer associated with a central entity and operable to receive messages from a voice over packet endpoint if impairments in a media stream sent between a first voice over packet endpoint and a second voice over packet endpoint pass a threshold, the media stream sent between the first voice over packet endpoint and the second voice over packet endpoint without passing through the central entity;
a processor coupled with the message buffer, the processor operable to:
determine, in response to receiving a message from a voice over packet endpoint, changes to the media characteristics for the voice over packet endpoint in relation to the impairments;
preliminarily alter one of packet redundancy levels or forward error correction settings for the media stream based on the message at the message buffer associated with the central entity; and
signal the voice over packet endpoint to adjust media characteristics of the media stream.

10. The apparatus of claim 9 wherein the processor can throttle the changes in media characteristics in response to reaching a criticality threshold where media quality would be deteriorated by the media characteristics changes.

11. The apparatus of claim 9 wherein the media characteristics include at least one of forward error correction and redundancy.

12. The apparatus of claim 9 wherein the processor can determine the media characteristics changes and bandwidth impacts of these changes.

13. The apparatus of claim 9 wherein voice over packet quality metrics are computed based on the impairments and the Voice over packet quality metrics are at least one of MOS-LQ, packet loss, frame loss, objective metrics, inter-arrival jitter, MOS-CQ and ITU G.107 R-factor.

14. The apparatus of claim 13 wherein the voice over packet quality metrics are concealed seconds objective metrics.

15. A system comprising:
a first voice over packet endpoint to send a media stream;
a second voice over packet endpoint to receive the media stream, monitor the media stream for impairments, compute voice over packet quality metrics based on the impairments, detect when a threshold is crossed for the voice over packet quality metrics, and send an event notification when the voice over packet quality metrics cross the threshold;
a central entity to determine changes to media characteristics of the media stream in relation to the impairments in response to the event notification, and to preliminarily alter one of packet redundancy levels or forward error correction settings for the media stream based on the event notification at the central entity, the media stream sent by the first voice over packet endpoint and received by the second voice over packet endpoint without passing through the central entity.

16. The system of claim 15 wherein the central entity can throttle the changes in media characteristics of the media stream in response to reaching a criticality threshold where media quality would be deteriorated by the media characteristics changes.

17. The system of claim 15 wherein the media characteristics include at least one of forward error correction and redundancy.

18. The system of claim 15 wherein the central entity can compute the media characteristics changes and bandwidth impacts of these changes.

19. The system of claim 15 wherein the voice over packet quality metrics are at least one of MOS-LQ, packet loss, frame loss, objective metrics, inter-arrival jitter, MOS-CQ and ITU G.107 R-factor.

20. The system of claim 15 wherein the first voice over packet endpoint and the second voice over packet endpoint communicate the voice over packet quality metrics with each other with Real-time Control Protocol Extended Reports (RTCP-XR).

21. The system of claim 15 wherein the second voice over packet endpoint notifies the central entity of a voice over packet quality metric threshold crossing with Skinny Client Control Protocol, Media Gateway Control Protocol, Session Initiation Protocol or H.248.

22. The system of claim 15 wherein the voice over packet quality metrics are concealed seconds objective metrics.

23. A method comprising:
monitoring a voice over packet media stream sent from a first voice over packet endpoint to a second voice over packet endpoint for packet loss at the second voice over packet endpoint;
computing voice over packet quality metrics based on any monitored packet loss;
sending the voice over packet quality metrics from the second voice over packet endpoint to a session peer;
when a threshold is crossed for the voice over packet quality metrics, sending an event notification to a central entity;
preliminarily altering one of packet redundancy levels or forward error correction settings for the voice over packet media stream based on the event notification at the central entity;
computing bandwidth and media quality impacts that the preliminary alterations will have on the voice over packet media stream at the central entity;
throttling the preliminary alterations of the voice over packet media stream when one of the computed bandwidth and media quality impacts on the voice over packet media stream meets a criticality threshold; and
signaling at least one of the first and second voice over packet endpoints from the central entity to communicate the alterations for the voice over packet media stream.

* * * * *